United States Patent [19]

Ou

[11] Patent Number: 5,230,947
[45] Date of Patent: Jul. 27, 1993

[54] FOAM BODY MADE INTEGRALLY OF AT LEAST A LAYER OF FOAM MATERIAL HAVING GREAT RESILIENCE AND AT LEAST A LAYER OF FOAM MATERIAL HAVING GREAT CAPABILITY TO ABSORB SHOCK

[76] Inventor: Jer-Wen Ou, No. 231, Cheng Kung 3rd Road, Nantou City, Taiwan

[21] Appl. No.: 990,082

[22] Filed: Dec. 14, 1992

[51] Int. Cl.$^5$ .......................... B32B 3/26; B32B 7/02
[52] U.S. Cl. .................... 428/212; 428/316.6; 521/97; 521/84.1; 521/140
[58] Field of Search .............................. 428/212, 316.6

[56] References Cited

U.S. PATENT DOCUMENTS 5,147,707  9/1992  Hasegawa et al. .................. 428/212
5,153,052  10/1992  Tanaka et al. ...................... 428/212

Primary Examiner—Morton Foelak
Attorney, Agent, or Firm—Browdy and Niemark

[57] ABSTRACT

A foam body is made integrally of at least a layer of foam material having great resilience and at least a layer of foam material having great capability to absorb shock. The foam material having great capability to absorb shock is made from a first mixture while the foam material having great resilience is made from a second mixture. The first and the second mixtures contain respectively 5-50% by weight of acrylobutadiene rubber, 50-95% by weight of polyvinyl chloride, a plasticizer, a bridging agent, a foaming agent, an extrusion-aiding agent and other additives. The first mixture differs from the second mixture in that the former contains less than 50 parts by weight of the plasticizer and that the latter contains more than 50 parts by weight of the plasticizer. The first and the second mixtures are stacked orderly in a mold cavity in which they are heated under pressure to foam to take shape of the foam body.

4 Claims, 1 Drawing Sheet

FOAM BODY MADE INTEGRALLY OF AT LEAST A LAYER OF FOAM MATERIAL HAVING GREAT RESILIENCE AND AT LEAST A LAYER OF FOAM MATERIAL HAVING GREAT CAPABILITY TO ABSORB SHOCK

BACKGROUND OF THE INVENTION

The present invention relates to a foam body made integrally of at least a layer of foam material having a great resilience and at least a layer of foam material having a great capability to absorb shock. These two layers of foam materials are identical in terms of the kinds of ingredients they contain but are different in terms of the proportions by which the ingredients are prepared.

Depending on the purpose of a foam body, a plastic foam material can be used to make a soft foam body or a rigid foam body by adjusting the proportions by which the ingredients are contained in the plastic foam material. Similarly, a plastic foam material can be used to make a foam body having great resilience or a foam body having great capability to absorb shock. It is well known that a foam body having great resilience is also provided with a shock-absorbing capability to a certain extent, and vice versa. For this reason, it is necessary that the term "great resilience" is defined in a precise manner here. If an iron ball having a weight of 33.5 g is allowed to make a free fall from a height of one meter on a foam body having a thickness of 10 centimeters, the foam body capable of making the iron ball to make the first bounce of 10 centimeters or more is said to have a great resilience while the foam body capable of making the iron ball to make the first bounce of less than 10 centimeters is said to have a great shock-absorbing capability. The quantity of resilience of the foam body is directly proportional to the quantity of the first bounce of the iron ball that falls freely on the foam body. On the other hand, the quality of the shock-absorbing capability of the foam body is inversely proportional to the quantity of the first bounce of the iron ball that falls freely on the foam body.

In order to make good use of foam bodies having various resilient and shock-absorbing characterstics, it is a common practice that various kinds of foam bodies are combined in a variety of forms. For example, a shoe insole or a shoe insert is generally made of foam bodies having respectively great resilience and great shock-absorbing capability so as to ensure the wearing comfort. In other words, the shoe insole or the shoe insert is generally a laminated body comprising layers of various foam materials. The manufacture of the shoe insert is a case in point. Such shoe insert is composed of layers of foam bodies, which are adhered together by a bonding agent, and is defective in that the labor cost of making the shoe insert is high, and that the bonding agent used to glue the layers of foam bodies is a potential source of environmental pollution, and further that the quality of the shoe insert is undermined by the topical formation of gas bubbles in the shoe insert caused by the bonding agent which evaporates in the course of baking the blank of shoe insert to take a final form, and still further that the glued layers of foam bodies are susceptible to detachment eventually, and finally that the shoe insert is vulnerable to distortion caused by the baking process in which the foam bodies made of different foam materials contract unevenly under a high temperature of the baking process. The shortcomings of the shoe insert described above are also shared by the shoe insole or the ornamental article, which is made of the prior art foam bodies described above.

SUMMARY OF THE INVENTION

It is, therefore, the primary objective of the present invention to provide a foam body made integrally of at least a layer of foam material having a great resiliency and at least a layer of foam material having a great capability to absorb shock. Such foam body overcomes the shortcomings of the prior art foam body described above.

In keeping with the principles of the present invention, the foregoing primary objective of the present invention is attained by a foam body, which is made integrally of at least a layer of foam material having a great resiliency and at least a layer of foam material having a great capability to absorb shock. These two layers of foam materials are identical in terms of the kinds of ingredients they contain but are different in terms of the proportions by which the ingredients are composed. The foam body is mainly composed of 5–50% by weight of acrylobutadiene rubber and 50–95% by weight of polyvinyl chloride. Every 100 parts by weight of the mixture of acrylobutadiene rubber and polyvinyl chloride is mixed with 20–150 parts by weight of a plasticizer, such as dioctyl phthalate, or dibutyl phthalate, or dioctyl adipate, a bridging agent, a foaming agent, an extrusion-aiding agent, and other additives. The foam materials so made are heated under pressure to foam in a mold cavity so as to form a foam body, which is characterized in that it is made from two or more mixtures containing the plasticizers in different proportions, with at least one of the mixtures containing the plasticizer under 50 parts by weight and with at least another one of the mixtures containing the plasticizer over 50 parts by weight. These mixtures are separately prepared and made to form the foam materials having a predetermined thickness. The foam materials so made are then stacked orderly in a mold cavity in which a foam body is made integrally of the foam materials under heat and pressure. The layer of the foam material containing the plasticizer over 50 parts by weight has a great resiliency while the layer of the foam material containing the plasticizer under 50 parts by weight has a great capability to absorb shock.

DETAILED DESCRIPTION OF THE PREFERRED EMBODIMENT

Figure 1:
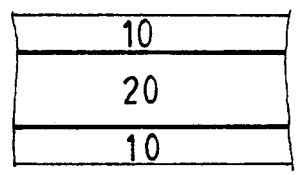
FIGS. 1–3 are schematic views showing the ways by which the formed foam materials are split and stripped, according to the present invention.

The embodiment of the present invention is described by means of a shoe insert, which is made according to the manufacturing steps described hereinafter.

The first step includes the preparation of two mixtures, each of which contains the identical ingredients. However, the identical ingredients contained respectively in these two mixtures are composed in different proportions. Each mixture is composed of 15% by weight of acrylobutadiene rubber, 85% by weight of polyvinyl chloride, a plasticizer, a bridging agent, a foaming agent, an extrusion-aiding agent, and other additives. The two mixtures differ from each other in that the first mixture 10 contains 40 parts by weight of a plasticizer and that the second mixture 20 contains 100 parts by weight of the plasticizer. The mixtures 10 and 20 contain the identical bridging agent, foaming agent, extrusion-aiding agent and other additives, all in the identical proportions. The plasticizer contained in the mixtures 10 and 20 is dioctyl phthalate, or dibutyl phthalate, or dioctyl adipate.

The second step involves a process in which the first mixture 10 and the second mixture 20 are further blended separately.

The third step includes a process in which the first and the second mixtures 10 and 20 are separately and thoroughly blended by means of a rolling machine.

The fourth step comprises a process of pressing separately the blended mixtures 10 and 20 by the rolling machine into pieces having a predetermined thickness.

Figure 2:
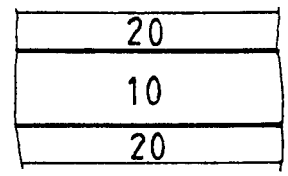
Figure 3:
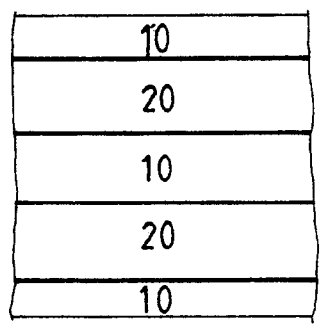

The fifth step includes a process in which pieces of the first mixture 10 and pieces of the second mixture 20 are stacked alternately to form sandwiches, as shown in FIGS. 1 and 2, and to form a cake, as shown in FIG. 3.

Figure 4:
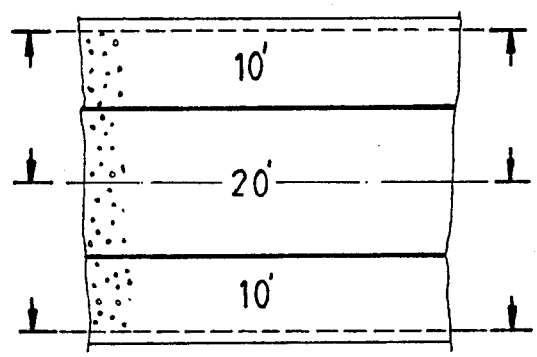
FIGS. 4 and 5 are schematic views showing the ways by which the formed foam materials are split and stripped, according to the present invention.
Figure 5:
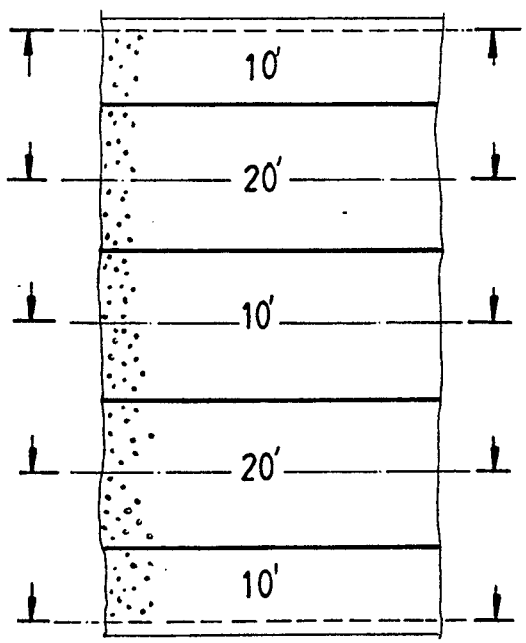
Figure 6:
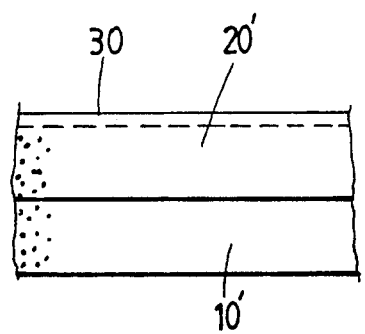
FIG. 6 is a schematic view showing that the split foam material is adhered to a piece of cloth, according to the present invention.

The sixth step includes a process in which the laminated sandwiches and the laminated cake obtained in the fifth step described above are heated under pressure to foam to take shape in the mold cavities in which they are arranged. As shown in FIGS. 4 and 5, the first mixture 10 containing less quantity of the plasticizer forms a shock-absorbing layer 10' while the second mixture 20 containing greater quantity of the plasticizer forms a resilient layer 20'.

The seventh step comprises a process of removing the formed foam body from the mold cavity.

The eighth step involves a process of splitting the formed foam body. The splitting of a sandwich-type foam body is accomplished by cutting it into two sheets of resilient and shock-absorbing layers along the center of the sandwich and along the portions adjacent to the edges of the sandwich, as shown in FIG. 4. The splitting of a cake-type foam body is attained by cutting it into a plurality of resilient and shock-absorbing layers along the center of each layer and along the top and the bottom edges of the cake-type foam body, as shown in FIG. 5.

The ninth step includes the production of an intermediate product by using a piece of cloth 30, which is adhered to the surface of the resilient layer 20'. The cloth 30 is permeable and is free from the formation of gas bubbles.

The tenth step includes a process of cutting the intermediate product obtained in the ninth step so as to have a size conforming to a specification.

The eleventh step includes a process of baking the trimmed intermediate product of the tenth step in an oven.

The twelfth step includes a process of arranging the baked intermediate product of the eleventh step in a mold cavity in which the baked intermediate product is pressured to take form of a shoe insert.

The thirteenth step includes a process of trimming the shoe insert formed in the twelfth step.

The shoe insert of the present invention comprises a top surface made of the cloth 30, an intermediate surface made of a resilient layer 20', and a bottom surface made of a shock-absorbing layer 10'. Therefore, the shoe insert of the present invention affords an exceptional wearing comfort.

The embodiment of the present invention described above is to be regarded in all respects as merely illustrative and not restrictive. Accordingly, the present invention may be embodied on other specific forms without deviating from the spirit thereof. For example, the embodiment of the present invention described above may be employed to produce a shoe insole, a carpet padding, a construction material, a furniture accessory, etc. In addition, the resiliency of the product of the present invention can be fortified by adding an appropriate amount of natural rubber to the mixtures making up the foam body of the present invention. Therefore, the present invention is to be limited only by the scope of the hereinafter appended claims.

What is claimed is:

1. A foam body made integrally of at least a layer of foam material having great resilience and at least a layer of foam material having great capability to absorb shock; wherein said foam material having great capability to absorb shock is made from a first mixture containing 5–50% by weight of acrylobutadiene rubber and 50–95% by weight of polyvinyl chloride, said first mixture further containing 20–150 parts by weight of a plasticizer in every 100 parts by weight of said first mixture which still further contains a bridging agent, a foaming agent, an extrusion-aiding agent and other additives; wherein said foam material having great resilience is made from a second mixture containing 5–50% by weight of acrylobutadiene rubber and 50–95% by weight of polyvinyl chloride, said second mixture further containing 20–150 parts by weight of a plasticizer in every 100 parts by weight of said second mixture which still further contains a bridging agent, a foaming agent, an extrusion-aiding agent and other additives; wherein said first mixture is different from said second mixture in that the former contains less than 50 parts by weight of said plasticizer and that the latter contains more than 50 parts by weight of said plasticizer; and wherein said first mixture and said second mixture are stacked orderly in a mold cavity in which said first mixture and said second mixture are heated under pressure to foam to take form of said foam body.

2. The foam body of claim 1 wherein said foam body can be made to have a greater resilience by adding an additive of natural rubber to said first mixture and said second mixture.

3. The foam body of claim 1 wherein said first mixture contains said plasticizer preferably in a range of 30 to 40 parts by weight; and wherein said second mixtuer contains said plasticizer preferably in a range of 80 to 120 parts by weight.

4. The foam body of claim 1 wherein said plasticizer is selected from the group consisting of dioctyl phthalate, dibutyl phthalate and dioctyl adipate.

* * * * *